United States Patent
Bitter et al.

(10) Patent No.: US 8,771,039 B2
(45) Date of Patent: Jul. 8, 2014

(54) OPTICAL FIBER POLISHING JIG FOR USE WITH OPTICAL CONNECTORS OF DIFFERING SIZES AND TYPES

(75) Inventors: Tobias Bitter, Regensburg (DE); Frank Weberpals, Regenstauf (DE)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 381 days.

(21) Appl. No.: 13/115,217

(22) Filed: May 25, 2011

(65) Prior Publication Data

US 2012/0302145 A1 Nov. 29, 2012

(51) Int. Cl.
*B24B 1/00* (2006.01)

(52) U.S. Cl.
USPC ............................................. 451/41; 451/364

(58) Field of Classification Search
USPC ..................................... 451/41, 364
See application file for complete search history.

(56) References Cited

U.S. PATENT DOCUMENTS

| | | | | |
|---|---|---|---|---|
| 5,140,779 A | * | 8/1992 | Grois | 451/365 |
| 5,349,784 A | * | 9/1994 | Grois et al. | 451/314 |
| 5,674,114 A | * | 10/1997 | Miller et al. | 451/278 |
| 5,720,653 A | * | 2/1998 | Miller et al. | 451/278 |
| 5,769,698 A | | 6/1998 | Chudoba et al. | |
| 5,863,242 A | | 1/1999 | Waldron et al. | |
| 5,961,374 A | | 10/1999 | Minami et al. | |
| 6,257,971 B1 | * | 7/2001 | Takahashi et al. | 451/365 |
| 6,396,996 B1 | | 5/2002 | Carpenter et al. | |
| 7,738,760 B2 | * | 6/2010 | Fredrickson et al. | 451/364 |
| 2004/0152399 A1 | | 8/2004 | Bianchi | |
| 2004/0161219 A1 | | 8/2004 | Suek et al. | |
| 2009/0060443 A1 | | 3/2009 | Fredrickson et al. | |

FOREIGN PATENT DOCUMENTS

| | | |
|---|---|---|
| CN | 101618521 A | 1/2010 |
| CN | 101628393 A | 1/2010 |
| EP | 1275471 A2 | 1/2003 |
| JP | 2004261898 A | 9/2004 |
| KR | 20100134894 A | 12/2010 |
| WO | 2005115688 A1 | 5/2005 |
| WO | 2010140449 A1 | 12/2010 |

OTHER PUBLICATIONS

HFBR-RXXYYYZ Series (POF) HFBR-EXXYYYZ Series (POF) Plastic Optical Fiber Cable and Accessories for Versatile Link; Avago Technologies Data Sheet; 11 Pages; Mar. 31, 2009; United States.
HFBR-4531Z/4532Z/4533Z/4535Z Crimpless Connectors for Plastic Optical Fiber and Versatile Link; Avago Technologies Data Sheet; 5 Pages; Jun. 4, 2007; United States.

* cited by examiner

*Primary Examiner* — Maurina Rachuba

(57) ABSTRACT

A polishing jig is provided that is capable of being used with different types, styles, and numbers of optical axes. For example, the polishing jig may be used with a variety of simplex connectors and with duplex connectors of at least first and second types. The first and second types of duplex connectors have different distances between the optical axes of their respective ferrules. The polishing jig may also be used with optical connectors having three or more ferrules having three or more respective optical axes.

26 Claims, 4 Drawing Sheets

OPTICAL FIBER POLISHING JIG FOR USE WITH OPTICAL CONNECTORS OF DIFFERING SIZES AND TYPES

TECHNICAL FIELD OF THE INVENTION

The invention relates to polishing jigs for use with optical connectors. More particularly, the invention relates to a polishing jig that can be used with optical connectors of different sizes and different types, or styles, and different numbers or arrangements of optical axes.

BACKGROUND OF THE INVENTION

A variety of optical connectors are used in the optical communications industry to mechanically and optically couple an end of an optical fiber cable to an optical fiber receptacle. In general, an optical connector includes a connector housing that is mechanically coupled to at least one optical fiber. The connector housing includes a ferrule that receives and surrounds a portion of the optical fiber adjacent an end of the optical fiber. The optical fiber comprises a fiber core, a cladding that surrounds the core, and a jacket that surrounds the cladding.

A simplex optical connector is an optical connector that connects to an end of a single fiber. Various types or styles of simplex connectors are available in the market. A duplex optical connector is an optical connector that connects to the ends of two optical fibers. Various types or styles of duplex connectors are also available in the market. Simplex and duplex connectors receive the ends of the optical fibers in ferrules formed in the connector housings. When the fiber ends are initially installed in the ferrules, the ends of the fibers extend out and away from the ends of the ferrules. An optical fiber polishing jig is often used to manually polish the end of the optical fiber and the end of the ferrule to cause the end of the fiber and the end of the ferrule to be flush with one another.

One known polishing jig has two openings formed in a front side thereof that are spaced apart by a distance that is equal to the distance between the optical axes of the ferrules of a particular type or style of duplex connector. To use the jig with a duplex connector, the ferrules of the duplex connector are placed in abutment with the openings formed in the jig such that the ends of the fibers pass through the openings formed in the jig and out of the back side of the jig. A piece of abrasive paper is then used to polish the ends of the fibers and of the ferrules until they are flush with the back side of the jig. Then, a piece of lapping film is used to further polish the flush ends of the fibers and the ferrules. To use the jig with a simplex optical connector, the ferrule of the connector is placed in abutment with one of the openings formed in the jig such that the end of the fiber passes through the opening formed in the jig and extends away from the back side of jig. The end of the fiber and the end of the ferrule are then polished in the manner described above using the aforementioned abrasive paper and lapping film.

Although the polishing jig described above is versatile in that it can be used with simplex and duplex connectors, it can only be used with duplex connectors that have a particular spacing between the optical axes of the ferrules. It cannot be used with duplex connectors in which the optical axes of the ferrules are spaced apart by different distances. Therefore, the polishing jig has limited versatility.

SUMMARY OF THE INVENTION

The invention is directed to a polishing jig and method. The polishing jig is configured for use in polishing ends of optical fibers connected to different types and styles of optical connectors. The jig comprises at least first, second and third tube structures disposed on a front side of the jig. The first, second and third tube structures have first, second and third openings, respectively, formed therein that extend from the front side of the jig to a backside of the jig. The openings are generally cylindrical in shape and have first, second and third diameters. The first, second and third openings have first, second and third longitudinal axes, respectively, corresponding to first, second and third optical axes, respectively, of the first, second and third tube structures, respectively. The first, second and third longitudinal axes are substantially parallel to one another. The first and second longitudinal axes are separated from each other by a first distance, D1. The second and third longitudinal axes are separated from each other by a second distance, D2. The first and third longitudinal axes are separated from each other by a third distance, D3.

The method comprises providing the polishing jig, placing an end of an optical connector in abutment with one or more ends of one or more of the tube structures such that one or more ferrules of the connector having one or more respective optical fibers disposed therein pass through one or more of the openings of the jig and extend from the back side of the jig, and polishing the end or ends of the optical fiber or fibers extending away from the back side of the jig.

These and other features and advantages of the invention will become apparent from the following description, drawings and claims.

DETAILED DESCRIPTION OF AN ILLUSTRATIVE EMBODIMENT

In accordance with embodiments of the invention, a polishing jig is provided that is capable of being used with various types and styles of optical connectors having different numbers of ferrules and respective optical axes. For example, the polishing jig is configured for use with at least simplex optical connectors, duplex optical connectors of a first type and duplex optical connectors of a second type, where the first and second types of duplex optical connectors have different distances between the optical axes of their respective ferrules. Illustrative, or exemplary, embodiments of the polishing jig will now be described with reference to FIGS. 1-4.

Figure 1:
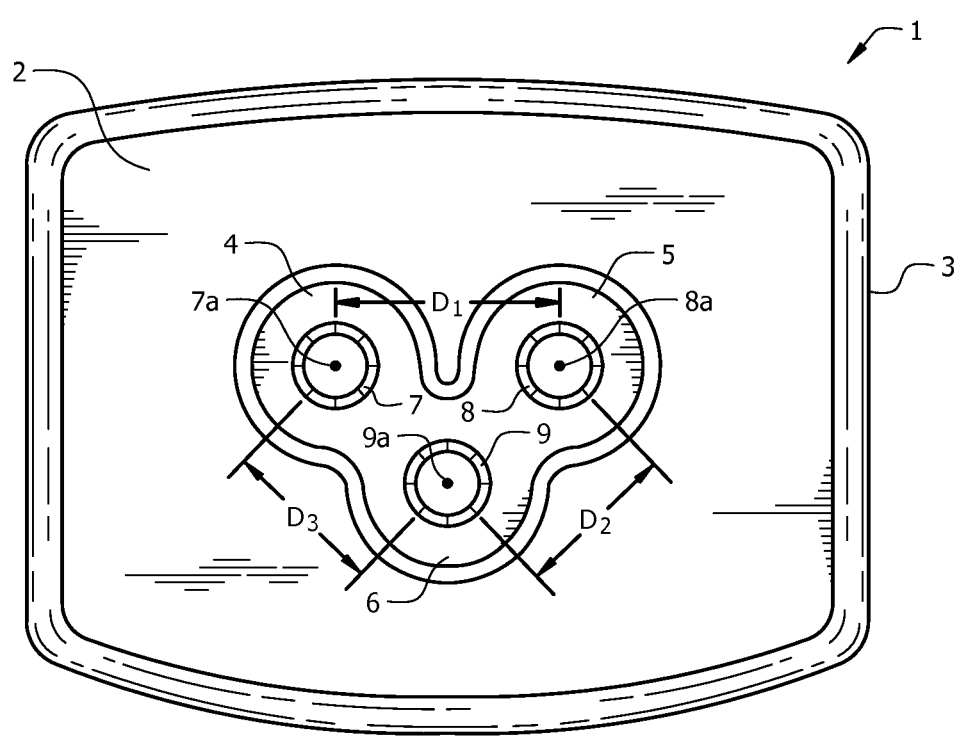
FIG. 1 illustrates a front plan view of the polishing jig in accordance with an illustrative embodiment.
Figure 2:
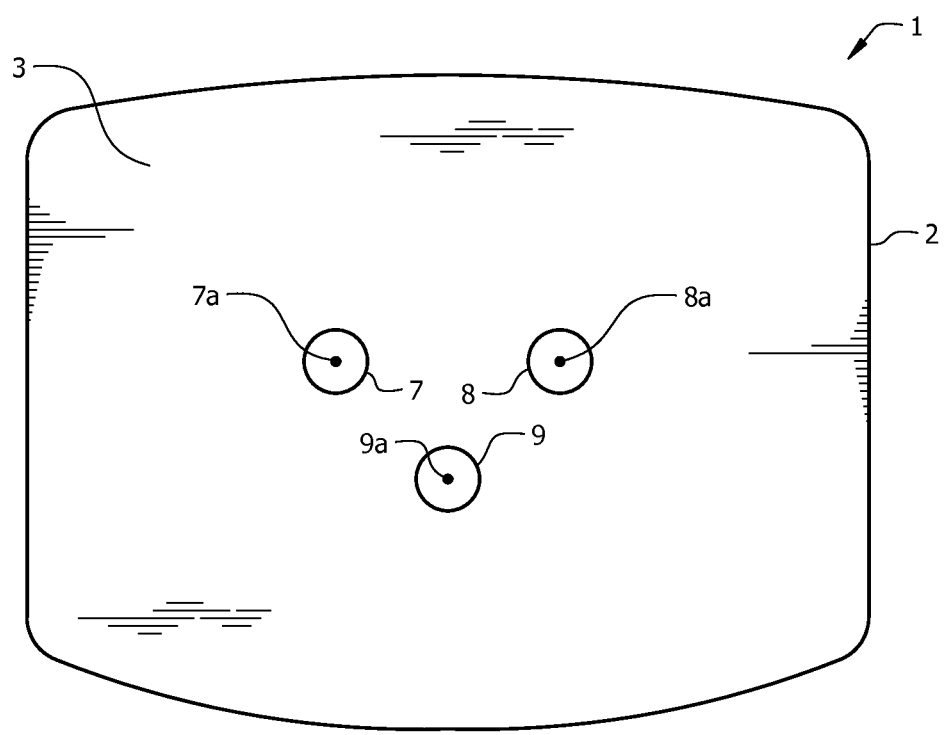
FIG. 2 illustrates a back plan view of the polishing jig in accordance with an illustrative embodiment.
Figure 3:
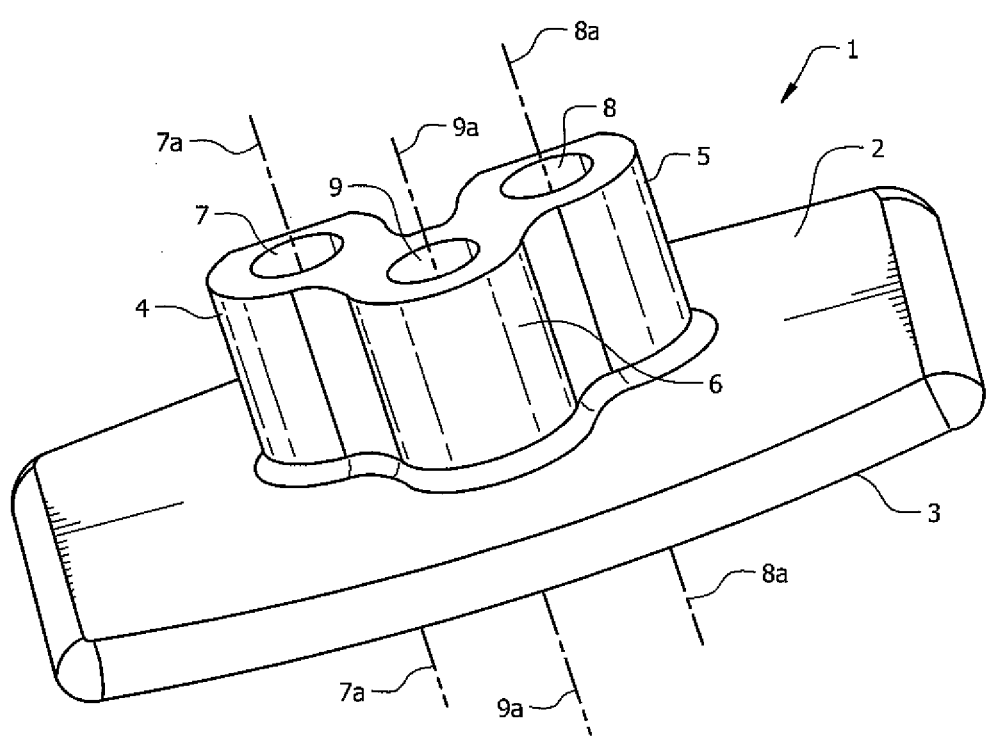
FIG. 3 illustrates a front perspective view of the polishing jig shown in FIGS. 1 and 2.
Figure 4:
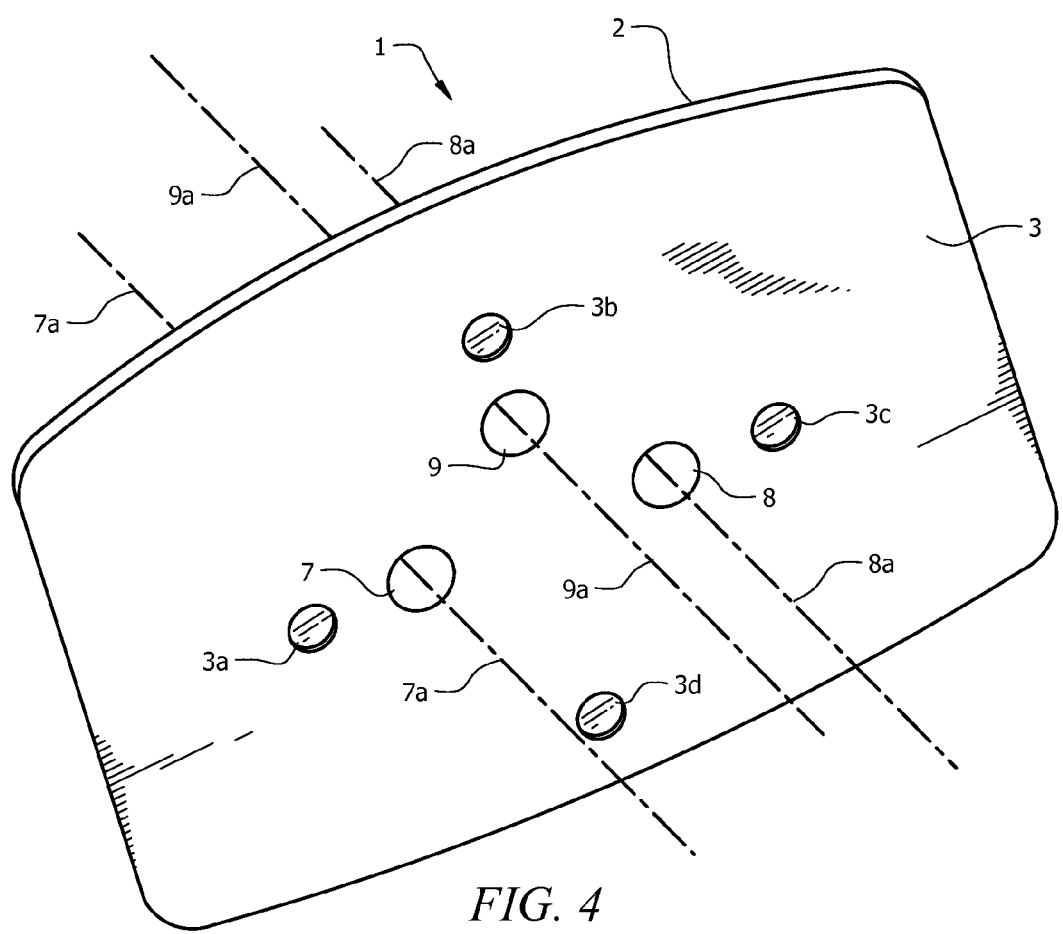
FIG. 4 illustrates a back perspective view of the polishing jig shown in FIGS. 1-3.

FIG. 1 illustrates a front plan view of the polishing jig 1 in accordance with an illustrative embodiment. FIG. 2 illustrates a back plan view of the polishing jig 1 shown in FIG. 1. FIG. 3 illustrates a front perspective view of the polishing jig 1 shown in FIGS. 1 and 2. FIG. 4 illustrates a back perspective view of the polishing jig 1 shown in FIGS. 1-3. In accordance with the illustrative embodiment depicted in FIGS. 1-4, the jig 1 is a single, integrally-formed part made of a generally rigid material, such as plastic, metal or wood, for example. The polishing jig 1 has a front side 2 and a back side 3, which are generally parallel to one another. The jig 1 has first, second and third tube structures 4, 5 and 6 disposed on the front side 2 thereof. The first, second and third tube structures 4, 5 and 6 have openings 7, 8 and 9, respectively, formed therein that extend from the front side 2 of the jig 1 to the backside 3 of the jig 1. The openings 7, 8 and 9 are generally cylindrical in shape to match the generally cylindrical shapes of the optical fibers (not shown) with which the jig 1 will be used. The openings 7, 8 and 9 have diameters that are generally equal to, but slightly larger than, the diameters of the ferrules of the optical connectors (not shown) with which the jig 1 will be used. The openings 7, 8 and 9 have longitudinal axes 7a, 8a and 9a, respectively, which correspond to optical axes of the tube structures 4, 5 and 6, respectively.

The longitudinal axes 7a, 8a and 9a of the openings 7, 8 and 9 are generally parallel to one another and are separated by predetermined distances. Longitudinal axes 7a and 8a are separated from each other by distance D1. Longitudinal axes 8a and 9a are separated from each other by distance D2. Longitudinal axes 9a and 7a are separated from each other by distance D3. The invention is not limited with respect to the values of D1, D2 and D3. In accordance with this illustrative embodiment, distances D2 and D3 are equal to each other and different from distance D1. For exemplary purposes, it will be assumed in accordance with this embodiment that distance D1 is equal to 10.16 millimeters (mm) and that distances D2 and D3 are equal to 7.35 mm. These particular values for the distances D1, D2 and D3 allow the jig 1 to be used with particular types of optical connectors, as will now be described with reference to FIGS. 1-4.

Any of the openings 7, 8 and 9 can be used to polish an optical fiber end and a ferrule of a simplex optical connector (not shown), provided that the diameter of the ferrule that surrounds the optical fiber is smaller than the diameter of whichever of the openings 7, 8 and 9 is used. To use the jig 1 with a simplex optical connector, a user places the simplex optical connector in abutment with the end of the corresponding tube structure 4, 5 or 6 such that the optical fiber and ferrule of the simplex optical connector pass through the opening 7, 8 or 9 and extend out of the back side 3 of the jig 1. The end of the optical fiber typically extends away from the back side 3 of the jig 1 by a distance of about 1.5 mm. The ends of the fiber and of the ferrule of the simplex optical connector are then polished in the manner described above until the ends of the fiber and of the ferrule are flush with the back side 3 of the jig 1. As can be seen in FIG. 4, the back side 3 of the jig 1 has four wear indicators 3a-3d formed therein where a thin layer of the back side 3 has been removed. When these wear indicators 3a-3d are no longer visible, the jig 1 should be replaced.

The invention is not limited with respect to the type of simplex optical connector that may be polished using the jig 1, except that the diameter of the ferrule that surrounds the optical fiber is smaller than the diameter of whichever of the openings 7, 8 and 9 is used. Thus, the term "simplex optical connector", as that term is used herein, denotes any simplex optical connector having a ferrule diameter that is smaller than the diameter of whichever of the openings 7, 8 and 9 is used.

The jig 1 may be used to polish different types of duplex optical connectors having different distances between their optical axes. For purposes of discussion, these optical connectors will be referred to as type 1 and type 2 duplex optical connectors. Type 1 duplex optical connectors may have different physical configurations, such as different connector housing designs, except that the connectors have a distance between the optical axes of the two ferrules of the connectors that is equal to distance D1. Type 2 duplex optical connectors may also have different physical configurations, such as different connector housing designs, except that the connectors have a distance between the optical axes of the two ferrules of the connectors that is equal to distance D2=D3. Thus, type 1 duplex optical connectors may be polished with the jig 1 by using the pair of openings 7 and 8 and type 2 duplex optical connectors may be polished with the jig 1 by using either the pair of openings 8 and 9 or the pair of openings 7 and 9.

As indicated above, type 1 duplex optical connectors may include different styles of duplex optical connectors, provided that the duplex optical connectors all have the same distance between the optical axes of the ferrules equal to D1. Thus, the term "type 1 duplex optical connectors", as that term is used herein, denotes any duplex optical connector having a distance between the optical axes of the ferrules of the connector that is equal to, or at least substantially equal to, D1. Likewise, type 2 duplex optical connectors may include different styles of duplex optical connectors, provided that the duplex optical connectors all have the same distance between the optical axes of the ferrules equal to D2=D3. Thus, the term "type 2 duplex optical connectors", as that term is used herein, denotes any duplex optical connector having a distance between the optical axes of the ferrules of the connector that is equal to, or at least substantially equal to, D2.

To use the jig 1 with a duplex optical connector, a user places the duplex optical connector in abutment with the ends of the corresponding tube structures 4 and 5, 5 and 6, or 6 and 7, such that the optical fibers and ferrules of the duplex optical connector pass through the openings 7 and 8, 8 and 9, or 7 and 9 and extend out of the back side 3 of the jig 1. The ends of the fibers and of the ferrules of the duplex optical connector are then polished in the manner described above until the ends of the fibers and of the ferrules are flush with the back side 3 of the jig 1.

It should be noted that although the jig 1 has been described as being configured to be used with simplex and duplex optical connectors, the jig 1 may be used with other types of optical connectors. For example, the jig 1 may be used with optical connectors having three optical axes. The jig 1 may also be fashioned to have more than three openings 7, 8 and 9 so that it may be used with optical connectors having more than three optical axes. Also, although the openings 7, 8 and 9 are arranged in a triangular pattern, they may arranged in other patterns, such as linear, circular or rectangular patterns, for example. It should also be noted that the shape of the jig 1 defined by the edges where the front side 2 and back side 3 meet is not limited to any particular shape. The shape is shown in FIGS. 1-4 as being generally rectangular, but the jig 1 may have any desired shape.

It should be noted that the invention has been described with respect to illustrative embodiments for the purpose of describing the principles and concepts of the invention. The invention is not limited to these embodiments. For example, the invention is not limited to the openings 7, 8 and 9 having any particular sizes of diameters or having diameters that are equal in size. Also, although the openings 7, 8 and 9 are depicted as being circular in shape, the openings 7, 8 and 9 may have other shapes, e.g., elliptical. The invention also is not limited to having only the three openings 7, 8 and 9. The jig 1 may have more than three openings to enable the jig 1 to have even greater versatility, i.e., to be used with more than two types of duplex optical connectors, optical connectors with more than two ferrules and respective optical axes, and a variety of simplex optical connectors. Also, while the distances D2 and D3 have been described in the illustrative embodiment as being equal, these distances may be unequal. As will be understood by those skilled in the art in view of the description being provided herein, many modifications may be made to the embodiments described herein while still achieving the goals of the invention, and all such modifications are within the scope of the invention.

What is claimed is:

1. A polishing jig for use in polishing ends of optical fibers connected to optical connectors, the jig comprising:
at least first, second and third tube structures disposed on a front side of the jig, the first, second and third tube structures having first, second and third openings, respectively, formed therein that extend from the front side of the jig to a backside of the jig, the openings being generally cylindrical in shape and having first, second and third diameters, the first, second and third openings having first, second and third longitudinal axes, respectively, corresponding to first, second and third optical axes, respectively, of the first, second and third tube structures, respectively, wherein the first, second and third longitudinal axes are substantially parallel to one another, wherein the first and second longitudinal axes are separated from each other by a first distance, D1, wherein the second and third longitudinal axes are separated from each other by a second distance, D2, wherein the first and third longitudinal axes are separated from each other by a third distance, D3, and wherein the first and second distances D1 and D2 are unequal, and wherein the polishing jig is suitable for use with simplex optical connectors and with at least a first type of optical duplex connector, the first type of optical duplex connector having a first distance between first and second ferrules of the first type of optical duplex connector, the first distance between the first and second ferrules of the first type of optical duplex connector being substantially equal to the first distance D1.

2. The polishing jig of claim 1, wherein the polishing jig is also suitable for use with at least a second type of optical duplex connector, the second type of optical duplex connector having a second distance between first and second ferrules of the second type of optical duplex connector, the second distance between the first and second ferrules of the second type of optical duplex connector being substantially equal to the second distance D2.

3. The polishing jig of claim 2, wherein second and third distances D2 and D3 are equal.

4. The polishing jig of claim 2, wherein second and third distances D2 and D3 are unequal.

5. The polishing jig of claim 1, wherein the front and back sides of the jig are generally parallel to one another.

6. The polishing jig of claim 1, wherein first distance D1 is equal to approximately 10 millimeters (mm).

7. The polishing jig of claim 1, wherein second distance D2 is equal to approximately 7 millimeters (mm).

8. The polishing jig of claim 7, wherein second and third distances D2 and D3 are equal to one another.

9. The polishing jig of claim 1, wherein the polishing jig is suitable for use with optical connectors having at least first, second and third ferrules having first, second and third optical axes, respectively, such that if the optical connector is engaged with the polishing jig, the first, second and third ferrules are received within the first, second and third tube structures of the polishing jig.

10. The polishing jig of claim 1, wherein the polishing jig is made of a single, unitary piece of plastic material.

11. A method for using a polishing jig, the method comprising:
providing a polishing jig having a front side and a back side and at least first, second and third tube structures disposed on the front side, the first, second and third tube structures having first, second and third openings, respectively, formed therein that extend from the front side of the jig to a backside of the jig, the openings being generally cylindrical in shape and having first, second and third diameters, the first, second and third openings having first, second and third longitudinal axes, respectively, corresponding to first, second and third optical axes, respectively, of the first, second and third tube structures, respectively, wherein the first, second and third longitudinal axes are substantially parallel to one another, wherein the first and second longitudinal axes are separated from each other by a first distance, D1, wherein the second and third longitudinal axes are separated from each other by a second distance, D2, wherein the first and third longitudinal axes are separated from each other by a third distance, D3, and wherein first and second distances D1 and D2 are not equal to one another, and wherein the optical connector is selected from a group of optical connectors including optical simplex connectors and at least a first type of optical duplex connector, the first type of optical duplex connector having a first distance between first and second ferrules of the first type of optical duplex connector, the first distance between the first and second ferrules of the first type of optical duplex connector being substantially equal to the first distance D1;
placing an end of an optical simplex connector or an optical duplex connector of the first type in abutment with one or more ends of one or more of the tube structures such that one or more ferrules of the optical connector pass through one or more of the openings and one or more optical fibers disposed within the ferrules extend from the back side of the jig; and
polishing the end or ends of the optical fiber or fibers extending away from the back side of the jig.

12. The method of claim 11, wherein group also includes a second type of optical duplex connector, the second type of optical duplex connector having a second distance between first and second ferrules of the second type of optical duplex connector, the second distance between the first and second ferrules of the second type of optical duplex connector being substantially equal to the second distance D2.

13. The method of claim 12, wherein the second and third distances D2 and D3 are equal.

14. The method of claim 12, wherein the second and third distances D2 and D3 are unequal.

15. The method of claim 11, wherein the front and back sides of the jig are generally parallel to one another.

16. The method of claim 11, wherein first distance D1 is equal to approximately 10 millimeters (mm).

17. The method of claim 11, wherein the second distance D2 is equal to approximately 7 millimeters (mm).

18. The method of claim 17, wherein second and third distances D2 and D3 are equal to one another.

19. A polishing jig for use in polishing ends of optical fibers connected to optical connectors, the jig comprising:
at least first, second and third tube structures disposed on a front side of the jig, the first, second and third tube structures having first, second and third openings, respectively, formed therein that extend from the front side of the jig to a backside of the jig, the openings being generally cylindrical in shape and having first, second and third diameters, and wherein the first, second and third openings have first, second and third longitudinal axes, respectively, corresponding to first, second and third optical axes, respectively, of the first, second and third tube structures, respectively, wherein the first and second longitudinal axes are parallel to one another and are separated from one other by a first distance, D1, wherein the second and third longitudinal axes are parallel to one another and are separated from one another by a second distance, D2, wherein the first and third longitudinal axes are parallel to one another and are separated from one another by a third distance, D3, and wherein the polishing jig is suitable for use with simplex optical connectors and with at least first and second types of optical duplex connectors, wherein first and second optical axes of first and second ferrules, respectively, of the first type of optical duplex connector are separated by a distance that is substantially equal to the first distance D1, and wherein first and second optical axes of first and second ferrules, respectively, of the second type of optical duplex connector are separated by a distance that is substantially equal to the second distance D2.

20. The polishing jig of claim 19, wherein the first and second distances D1 and D2 are unequal.

21. The polishing jig of claim 20, wherein second and third distances D2 and D3 are equal.

22. The polishing jig of claim 20, wherein second and third distances D2 and D3 are unequal.

23. A method for using a polishing jig, the method comprising:

providing a polishing jig that is suitable for use with simplex optical connectors and with at least first and second types of optical duplex connectors, wherein first and second optical axes of first and second ferrules, respectively, of the first type of optical duplex connector are separated by a distance, and wherein first and second optical axes of first and second ferrules, respectively, of the second type of optical duplex connector are separated by a distance, the polishing jig having a front side and a back side and at least first, second and third tube structures disposed therein that are defined by first, second and third openings, respectively, formed in the polishing jig and extending from the front side of the jig to a backside of the jig, the first, second and third tube structures having first, second and third optical axes, respectively, wherein the first and second optical axes are parallel to one another and are separated from one another by a first distance, D1, that is equal to the distance between the first and second optical axes of the first and second ferrules, respectively, of the first type of optical duplex connector, and wherein the second and third optical axes are parallel to one another and are separated from one another by a second distance, D2, that is equal to the distance between the first and second optical axes of the first and second ferrules, respectively, of the second type of optical duplex connector, and wherein the first and third optical axes are separated from each other by a third distance, D3;

placing an end of an optical simplex connector, a first type of optical duplex connector, or a second type of optical duplex connector in abutment with one or more ends of one or more of the tube structures such that one or more ferrules of the abutting optical connector pass through one or more of the openings and such that one or more optical fibers disposed within the ferrules extend from the back side of the jig; and polishing the end or ends of the optical fiber or fibers extending from the back side of the jig.

24. The method of claim 23, wherein first and second distances D1 and D2 are not equal to one another.

25. The method of claim 24, wherein second and third distances D2 and D3 are equal.

26. The method of claim 24, wherein second and third distances D2 and D3 are unequal.

* * * * *